(12) United States Patent
Plaisted

(10) Patent No.: US 8,344,239 B2
(45) Date of Patent: Jan. 1, 2013

(54) MECHANISM FOR MOUNTING SOLAR MODULES

(75) Inventor: Joshua Reed Plaisted, Berkeley, CA (US)

(73) Assignee: PVT Solar, Inc., Fremont, CA (US)

( * ) Notice: Subject to any disclaimer, the term of this patent is extended or adjusted under 35 U.S.C. 154(b) by 876 days.

(21) Appl. No.: 10/855,254

(22) Filed: May 26, 2004

(65) Prior Publication Data
US 2006/0086382 A1 Apr. 27, 2006

Related U.S. Application Data

(60) Provisional application No. 60/544,753, filed on Feb. 13, 2004.

(51) Int. Cl.
*H02N 6/00* (2006.01)
(52) U.S. Cl. .................................................. 136/251
(58) Field of Classification Search .............. 136/244, 136/251; 52/173.3; 249/219.1
See application file for complete search history.

(56) References Cited

U.S. PATENT DOCUMENTS

| | | | |
|---|---|---|---|
| 1,159,372 A | 10/1915 | Goff | |
| 1,306,434 A | 6/1919 | Melanson | |
| 2,747,166 A | 5/1956 | Hoffarth | |
| 3,881,799 A | 5/1975 | Elliott et al. | |
| 4,029,080 A | 6/1977 | Warren | |
| 4,061,413 A | 12/1977 | Keller | |
| 4,150,660 A | 4/1979 | Peters et al. | |
| 4,239,555 A | 12/1980 | Scharlack et al. | |
| 4,336,413 A | 6/1982 | Tourneux | |
| 4,372,292 A | 2/1983 | Ort | |
| 4,636,577 A | 1/1987 | Peterpaul | |
| 4,936,063 A | 6/1990 | Humphrey | |
| 4,961,712 A | 10/1990 | Schwenk et al. | |
| 4,993,959 A | 2/1991 | Randollph | |
| 5,180,442 A | 1/1993 | Elias | |
| 5,338,369 A | 8/1994 | Rawlings | |
| 5,409,549 A * | 4/1995 | Mori | 136/244 |
| 5,451,167 A | 9/1995 | Zielinski et al. | |
| 5,497,587 A * | 3/1996 | Hirai et al. | 52/173.3 |
| 5,524,401 A | 6/1996 | Ishikawa et al. | |
| 5,571,338 A | 11/1996 | Kadonome et al. | |
| 5,603,187 A | 2/1997 | Merrin et al. | |
| 5,687,453 A | 11/1997 | Megregian et al. | |

(Continued)

FOREIGN PATENT DOCUMENTS

DE 19804685 A1 8/1999

(Continued)

OTHER PUBLICATIONS

TELESTRUT Telescoping Strut; UNISTRUT ; http://web.archive.org/web/20030202040614/http://www.unistrut.com/.*

(Continued)

*Primary Examiner* — Jennifer Michener
*Assistant Examiner* — Dustin Q Dam
(74) *Attorney, Agent, or Firm* — Mahamedi Paradice Kreisman LLP

(57) ABSTRACT

A mounting system is provided for solar modules with a compressable retention structure for solar modules. The retention structure may interleave a upper and lower rail that provides a shelf or other support structure in order to hold a solar module or panel in an operative position. The upper and lower rails may be compressed towards one another in order to cause the support structure to retain the solar modules or panels.

31 Claims, 11 Drawing Sheets

U.S. PATENT DOCUMENTS

| | | | |
|---|---|---|---|
| 5,740,996 A | 4/1998 | Genschorek | |
| 5,788,204 A | 8/1998 | Goodwin et al. | |
| 5,851,309 A | 12/1998 | Kousa | |
| 5,924,486 A | 7/1999 | Ehlers et al. | |
| 5,986,203 A * | 11/1999 | Hanoka et al. | 136/251 |
| 6,106,310 A | 8/2000 | Davis et al. | |
| 6,195,066 B1 | 2/2001 | Pegues et al. | |
| 6,201,179 B1 | 3/2001 | Dalacu | |
| 6,269,596 B1 | 8/2001 | Ohtsuka et al. | |
| 6,283,770 B1 | 9/2001 | Leung et al. | |
| 6,320,120 B1 | 11/2001 | Van Haaster | |
| 6,323,478 B1 | 11/2001 | Fujisaki et al. | |
| 6,366,304 B1 | 4/2002 | Nakayasu et al. | |
| 6,465,724 B1 | 10/2002 | Garvison et al. | |
| 6,521,821 B2 | 2/2003 | Makita et al. | |
| 6,959,517 B2 | 11/2005 | Poddany et al. | |
| 7,012,188 B2 | 3/2006 | Erling | |
| 7,293,748 B1 | 11/2007 | Hoser | |
| 7,406,800 B2 | 8/2008 | Cinnamon et al. | |
| 7,419,377 B1 | 9/2008 | Briere et al. | |
| 7,469,508 B2 | 12/2008 | Ceria | |
| 7,591,690 B1 | 9/2009 | Fan et al. | |
| 7,721,492 B2 | 5/2010 | Plaisted et al. | |
| 7,774,998 B2 | 8/2010 | Aschenbrenner | |
| 7,780,472 B2 | 8/2010 | Lenox | |
| 2002/0078991 A1 | 6/2002 | Nagao et al. | |
| 2003/0010372 A1* | 1/2003 | Dinwoodie | 136/244 |
| 2003/0015637 A1* | 1/2003 | Liebendorfer | 248/237 |
| 2003/0071177 A1 | 4/2003 | Aussiker | |
| 2003/0094193 A1* | 5/2003 | Mapes et al. | 136/244 |
| 2003/0201009 A1* | 10/2003 | Nakajima et al. | 136/251 |
| 2004/0011354 A1 | 1/2004 | Erling | |
| 2004/0163338 A1* | 8/2004 | Liebendorfer | 52/173.1 |
| 2004/0187909 A1 | 9/2004 | Sato et al. | |
| 2005/0161074 A1 | 7/2005 | Garvison et al. | |
| 2005/0257453 A1 | 11/2005 | Cinnamon | |
| 2006/0032527 A1 | 2/2006 | Stevens et al. | |
| 2006/0042682 A1 | 3/2006 | Wolfe et al. | |
| 2006/0118163 A1 | 6/2006 | Plaisted et al. | |
| 2006/0124167 A1 | 6/2006 | Fan et al. | |
| 2006/0225780 A1 | 10/2006 | Johnson, III et al. | |
| 2007/0251567 A1 | 11/2007 | Plaisted | |
| 2007/0295391 A1 | 12/2007 | Lenox et al. | |
| 2008/0053009 A1 | 3/2008 | Plaisted | |
| 2008/0053517 A1 | 3/2008 | Plaisted | |
| 2008/0121273 A1 | 5/2008 | Plaisted et al. | |
| 2008/0169018 A1 | 7/2008 | Miyamoto et al. | |
| 2009/0019796 A1 | 1/2009 | Liebendorfer | |
| 2009/0038668 A1 | 2/2009 | Plaisted | |
| 2009/0165843 A1 | 7/2009 | Horioka et al. | |
| 2010/0018571 A1 | 1/2010 | Placer | |
| 2011/0100433 A1 | 5/2011 | Jonczyk | |
| 2011/0173900 A1 | 7/2011 | Plaisted et al. | |
| 2011/0174360 A1 | 7/2011 | Plaisted et al. | |
| 2011/0210085 A1 | 9/2011 | Plaisted | |

FOREIGN PATENT DOCUMENTS

| | | | |
|---|---|---|---|
| EP | 0417303 A1 | 3/1991 | |
| EP | 0587348 A2 | 3/1994 | |
| EP | 0599497 A1 | 6/1994 | |
| EP | 0614058 A2 | 9/1994 | |
| EP | 0905795 A2 | 3/1999 | |
| EP | 1873843 A2 | 1/2007 | |
| JP | 09-184209 A | 7/1997 | |
| JP | 10-159201 A | 6/1998 | |
| JP | 11-186586 A | 7/1999 | |
| JP | 11-204819 A | 7/1999 | |
| JP | 2000-100490 A | 4/2000 | |
| JP | 2001-214579 A | 8/2001 | |
| JP | 2001-262800 A | 9/2001 | |
| JP | 2004-251037 A | 9/2004 | |
| JP | 2005-194771 A | 7/2005 | |
| JP | 2007-262764 A | 10/2007 | |
| WO | WO 0241407 A1 * | 5/2002 | |

OTHER PUBLICATIONS

Unistrut Telespar Telescoping Tubing; UNISTRUT ; http://web.archive.org/web/20030202040614/http://www.unistrut.com/.*

International Search Report and Written Opinion of the International Searching Authority in International Application PCT/US2006/001593, World Intellectual Property Organization, Oct. 27, 2006, 19 pages.

International Preliminary Report on Patentability in International Application PCT/US2006/001593, World Intellectual Property Organization, Jul. 26, 2007, 11 pages.

International Search Report and Written Opinion of the International Searching Authority in International Application PCT/US2007/77433, World Intellectual Property Organization, Mar. 26, 2006, 10 pages.

International Search Report and Written Opinion of the International Searching Authority in International Application PCT/US2007/69304, World Intellectual Property Organization, Mar. 4, 2008, 12 pages.

Communication Pursuant to Article 94(3) EPC in Application No. 06733720.4-1266, European Patent Office, Jul. 16, 2008, 6 pages.

Non-Final Office Action dated Nov. 13, 2008 in U.S. Appl. No. 11/851,299, 9 pgs.

Final Office Action dated Jun. 10, 2009 in U.S. Appl. No. 11/851,299, 10 pages.

Non-Final Office Action dated Jun. 22, 2009 in U.S. Appl. No. 11/332,000, 13 pages.

Final Office Action dated Dec. 7, 2009 in U.S. Appl. No. 11/332,000, 11 pgs.

International Preliminary Report on Patentability in International Application PCT/US2007/075531, World Intellectual Property Organization, Oct. 15, 2009, 8 pages.

International Search Report and Written Opinion of Sep. 30, 2009 10 pages.

Non-Final Office Action dated Mar. 15, 2010 in U.S. Appl. No. 11/750,948; 9 pgs.

Non-Final Office Action dated Jan. 13, 2010 in U.S. Appl. No. 11/947,658 pgs.

Notice of Allowance dated Jan. 11, 2010 in U.S. Appl. No. 11/851,299; 8 pgs.

Restriction Requirement dated Mar. 5, 2010 in U.S. Appl. No. 11/848,766; 6 pgs.

U.S. Appl. No. 12/761,325, filed Apr. 15, 2010, Plaisted.

Communication Pursuant to Article 94(3) EPC in Application No. 06733720.4-1266, European Patent Office, May 25, 2010.

Non-Final Office Action dated Jul. 12, 2010 in U.S. Appl. No. 11/848,766.

Notice of Allowance dated Jul. 12, 2010 in U.S. Appl. No. 11/947,658.

Notice of Allowance dated May 6, 2010 in U.S. Appl. No. 11/332,000.

Non-Final Office Action dated Nov. 9, 2010 in U.S. Appl. No. 11/836,140.

Notice of Allowance dated Sep. 30, 2010 in U.S. Appl. No. 11/750,948.

Notice of Allowance dated Sep. 27, 2010 in U.S. Appl. No. 11/332,000.

Non-Final Office Action dated Mar. 25, 2011 in U.S. Appl. No. 12/761,325.

Non-Final Office Action dated Apr. 15, 2011 in U.S. Appl. No. 12/949,551.

Non-Final Office Action dated Mar. 30, 2011 in U.S. Appl. No. 11/848,766.

Examination Report of Jul. 25, 2011 in European Application No. 06733720.4.

Examination Report of Dec. 21, 2010 in Australian Application No. 2007347697.

Final Office Action dated Nov. 4, 2011 in U.S. Appl. No. 11/848,766.

Final Office Action dated Nov. 7, 2011 in U.S. Appl. No. 12/949,551.

Final Office Action dated Aug. 15, 2011 in U.S. Appl. No. 12/761,325.
Final Office Action dated Jul. 20, 2011 in U.S. Appl. No. 11/836,140.
Non-Final Office Action dated Sep. 9, 2011 in U.S. Appl. No. 12/947,601.

Non-Final Office Action dated Jul. 22, 2011 in U.S. Appl. No. 13/042,266.

* cited by examiner

MECHANISM FOR MOUNTING SOLAR MODULES

PRIORITY APPLICATIONS

This application claims benefit of priority to Provisional U.S. Patent Application No. 60/544,753, filed Feb. 13, 2004, entitled SYSTEM, METHOD, AND APPARATUS FOR MOUNTING A SOLAR MODULE, and naming Joshua Reed Plaisted as inventor. This priority application is hereby incorporated by reference in its entirety for all purposes.

TECHNICAL FIELD

The disclosed embodiments relate generally to the field of solar modules. In particular, the disclosed embodiments relate to a mechanism for mounting solar modules to a surface or sub-structure.

BACKGROUND

Modules for converting solar energy into useful forms of energy such as heat and electricity have been in existence for many years. Because of the sun's low energy intensity and the moderate conversion efficiency of solar modules, a large array of solar modules is often required to service the end-use of the energy. Array areas from several dozen square feet to several thousand square feet are common. Moreover, the variety of surfaces on which the modules may be mounted requires a wide range of flexibility and adaptability in the mounting hardware that will be used to structurally anchor the modules to the mounting surface.

An example of a solar module is a solar photovoltaic (PV) module, which consists of a series of PV cells connected in a series and parallel combination to yield a specific current and voltage output. Due to the fragility of the cells and the harsh environmental conditions they are often exposed to, the assembly of cells is often encapsulated into a rigid laminate. Most PV laminates are fabricated from a glass cover, an active layer containing the PV cells, and a back cover. While PV laminates can be directly attached to a mounting structure, it is more common for them to be framed before mounting. PV laminate frames typically consist of aluminum extrusions with an upper cavity that receives the laminate when assembled. The frame serves the purpose of increasing the rigidity of the laminate and to protect the fragile glass edge of the laminate from cracking. Frames for PV modules often include a lower flange with pre-drilled holes for affixing them to mounting structures.

Because PV modules must be electrically interconnected, they are often mounted in strings where the modules are assembled end to end to form a row of modules. Due to the fact that most mounting surfaces such as roofs are square or rectangular in nature, most PV module installations consist of multiple rows assembled in close proximity to match the general footprint of the surface on which they are mounted. Such arrangements of multiple rows of modules are generally referred to as an array.

Dual Strut Runner (DSR) Technique

A further example of a method for attaching rows of framed PV modules to a surface is through the use of Dual Strut Runners (DSR). In a DSR system, the PV modules are affixed to a pair of strut style rails that run the length of the assembled row. These rails are in turn affixed to the mounting surface through individual footings. The strut style rails used in this type of mounting may be either common channel style strut such as UNISTRUT™ of Wayne, Mich. or B-Line™ of Highland, Ill. or proprietary strut style rail made explicitly for mounting solar modules. Two examples of strut style rails made explicitly for mounting framed PV modules are described in US Published Patent Application Nos. 2003/0015636 A1 and 2002/0046506 A1 and are herein incorporated by reference in their entirety. The DSR system may also be employed with unframed PV laminates as disclosed in US Published Patent Application No. 2003/0070368 A1 and herein incorporated by reference in its entirety.

Two mounting methods are possible with most DSR systems. The first method is to attach the rails to the mounting surface with footings first and to then attach the PV modules to the rails with a front-side mounting technique. The second method is to first mount a row of modules onto the rails from the back-side to form a rigid sub-assembly consisting of multiple PV modules and then lift the entire sub-assembly onto the mounting surface to be attached. Both of these techniques have their benefits and drawbacks as outlined below.

Using the front-side mounting technique with DSR systems requires access to the rails such that mounting clips may be secured. If the PV modules were to directly abut one another then the rails would be obscured underneath them with no possible attachment points. To remedy this issue, a small gap on the order of 1" is typically left in between abutting modules to allow a fastening clip to be installed. The purpose of the fastening clip is to compress the PV module frames against the underlying rails. Although it is easy to attach the modules in this manner, a disadvantage of the front-side mounting technique is that it results in high pressures for a given clip compression. These high pressures can compromise the integrity of the module frame or the glass laminate and place an upper limit on practical clamping forces. Another disadvantage of this method is that visible gaps are left between the modules as well as the discrete clips, both of which ruin the visual aesthetics of the installation.

Many DSR systems may also be mounted using a back-side technique. With this technique, the rails are first attached to the back-side of the frames on the PV modules, often using holes supplied by the manufacturer in the PV module frame. Because access to the back-side of the modules is possible, there is no need for access from the front-side, and adjacent modules may therefore directly abut one another without a resultant gap. After a series of modules are attached to the strut runners to create a row, the entire row of modules is then lifted up onto the mounting surface to be attached to the footings. The primary advantage of the back-side technique is that the modules may be mounted in a seamless manner without the gap that results between modules with the front-side method. A primary disadvantage of the back-side method is that large assemblies of modules must be lifted onto the mounting surface. Whereas an individual may be able to lift and arrange single modules with the front-side method, several individuals and mechanical equipment is often required to lift and arrange entire rows as is necessary with the back-side method. A second disadvantage of the back-side method is that the strut runner positions are set when the subassembly is created and those positions must exactly match the footings already installed on the mounting surface. Two separate sub-assemblies are created that must have an exact match fit when fully assembled.

Common Compressed Rail Technique

There exists a need for a mounting system, method and apparatus for solar modules that would allow for the aesthetically preferred seamless mounting possible with the DSR back-side technique, but with the ease of installation that comes with the DSR front-side technique. The most practical method of attaining this ideal mounting technique is to employ a Common Compressed Rail (CCR) as the mounting structure that attaches the modules to the footings on the mounting surface.

The CCR method is quite common in the architectural glass industry for assembling monolithic curtain walls in high-rise buildings. The CCR method has been disclosed in U.S. Pat. Nos. 4,223,667 and 6,105,317, both of which are herein incorporated by reference in their entirety. The principal difference between the DSR and CCR methods is that the DSR method consists of a pair of rails placed underneath a row of modules while the CCR method consists of a common rail that bridges adjacent rows of modules.

By placing the mounting rail between rows of modules instead of underneath them, the CCR method allows the modules in a single row to seamlessly abut one another while still allowing access to the rail such that clamping of the modules may be attained.

In its most prevalent form, the CCR system consists of a lower rail that is affixed to the mounting surface. The lower rail contains a pair of extended shelves or surfaces to accept the solar modules that will rest on both the left and right sides of the rail. Once the solar modules have been assembled in the lower rails, an upper rail or cap that is designed to mate with the lower rail will be put in place and tightened against the lower rail. With the edges of the modules held between the upper and lower rails, the tightening of the upper rail compresses the modules within the assembly and keeps them captive. While the CCR technique overcomes some of the basic issues inherent with the DSR technique, the CCR systems as currently practiced suffer from several disadvantages.

There is currently no set standard for solar module frame construction resulting in a multitude of currently available frame heights with the vast majority falling in the range of 1 inch to 2 inches in height. The issue in racking different frame heights with a CCR system arises at the free edge of the module array. The free edge of the array occurs on the last row of the array where modules will be placed on only one side of the common rail and the other side is open or empty. If the rail set on the free edge were to be simply compressed, the upper and lower rails would begin to fold over on the free and unsupported side without attaining proper orientation and compression on the side containing the actual module frame. To properly compress the module frame, it becomes necessary to 'fix' the free edge at approximately the same height as that of the module frame such that further compression of the upper and lower rails results in compression and capture of the module frame.

Current implementations of the CCR technique rely on either a custom interference fit of the upper and lower rails to fix the free edge, or they implement a dummy module frame of the same height as the actual module frames to be racked. Both methods of fixing the free edge of the array are disclosed in U.S. Pat. No. 6,105,317 which is herein incorporated by reference in its entirety.

Using the custom interference fit method, a contact region in designed into the assembled fit of the upper and lower rails such that they contact at the approximate height of the module frames. Once the free edge of the rails has contacted in this manner, further compression results in clamping of the module frames with the contacted edge acting as a pivot. The disadvantage of this method is that a single rail combination can only accommodate a fraction of an inch in module frame height variation before the rails begin to significantly fold over on the free edge during compression. It therefore becomes necessary to create multiple rail sets to accommodate any significant variation in module frame heights.

The dummy frame method requires an empty frame with approximately the same height as the module frames. The dummy frame is installed on the free edge opposite the actual PV module frame. Because of the symmetry in frame heights, the rails will compress uniformly on both frames. This method incurs the same disadvantage as the custom interference fit in that each dummy frame can only accommodate a fraction of an inch in module frame height variation before another dummy frame is required. It is therefore necessary to create multiple dummy frames to accommodate any significant variation in module frame heights.

A further disadvantage common to the above described CCR system is the design of the upper rail section. Presently available CCR systems place the majority of their inertial mass and therefore rigidity in the lower rail section. The upper rail is often designed merely as a cosmetic capstrip with low inertial mass just sufficient to compress the module frame against the lower rail. The low inertial mass of the upper rail is insufficient to spread the force of the member that compresses the rails and therefore results in significant point loads on the PV module frames. The low inertial mass of the upper rail also compromises the rigidity of the compressed assembly and its ability to resist loading by wind and snow.

DETAILED DESCRIPTION

Figure 1:
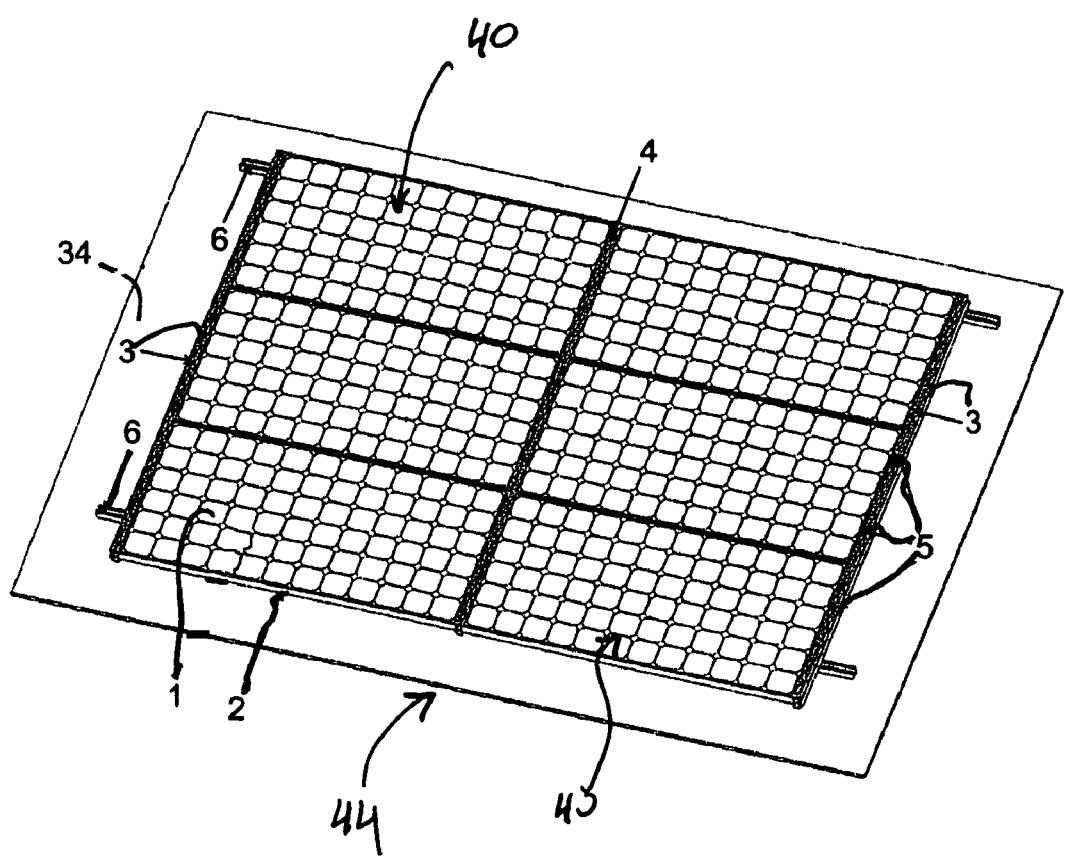
FIG. 1 is a frontal view of a solar module assembly, according to an embodiment of the invention.

Embodiments described herein provide a mounting system to retain solar modules. The mounting system may use a compression mechanism to retain solar modules. According to an embodiment, the compression mechanism may be used by an installer who has only access to a upper rail or segment of the overall mounting system. This facilitates the installer's ability to mount the solar modules on a given platform.

In one embodiment, a mounting system is provided that interleaves, or alternatively telescopes, a upper and lower rail for retaining the solar modules. The interleaving construction may be provided shelves or other support structures on which solar panels are extended.

In one embodiment, a mounting system described herein conforms to a Common Compressed Rail (CCR) construction. Additionally, embodiment described herein may accommodate a wide range of module frame thicknesses and heights while using a single rail set. Such an embodiment can provide a mechanism by which the shut height/thickness of the free edge is fixed, thereby obviating the need for multiple custom rail sets or dummy frames on a free edge of the array.

In an embodiment, at least one of the rails may be designed with elevated shelves to allow for clearance of the electrical junction box on framed PV modules. Both of the rails may also be designed with a high inertial mass so as to uniformly spread the force of the compression member. This improves the rigidity of the assembled structure, and also allows a splice to be made using the solar module frame itself as the structural splice member.

In one embodiment, an interleaved common compressed rail set serves to bridge adjacent rows of solar modules so as to affix them to a mounting surface. The modules may rest on shelves, protrusions, or other support structures that extend from one or both of the upper and lower rails. In one arrangement, the modules may be held captive by an upper rail with extended shelves that interleaves with the lower rail and compresses solar modules between the upper and lower rail sections. The interleave of the rails within one another allows for a variety of module heights to be mounted, and allows the free edge of the rail assembly to be fixed.

Many benefits may be attained by an embodiment such as described. Among the benefits, limitations inherent in Dual Strut Runner (DSR) mounting systems are overcome, and a CCR system may be employed to mount solar modules. Furthermore, embodiments provide that the CCR system allows for seamless front-side mounting of solar modules. In addition, the need for multiple rail sets or dummy frames such as required in existing CCR systems may be avoided. A structure such as described herein also accommodates solar modules having a variety of thickness.

Embodiments described herein include an assembly for mounting solar modules to a surface. The structure may include a upper rail on which a upper support structure is provided, and a lower rail on which a lower support structure is provided. One or both of the upper support structure and the lower support structure are structured to support one or more solar modules. The upper rail and the lower rail may also be structured relative to one another so that (i) at least one of the upper rail and the lower rail is moveable relative to the other of the upper rail and the lower rail, and (ii) the upper rail and the lower rail can move between an extended relative position and a contracted relative position. The upper rail and the lower rail are moveable towards the contracted relative position in order to retain the one or more solar modules using the at least one of the upper support structure and the lower support structure.

Figure 2:
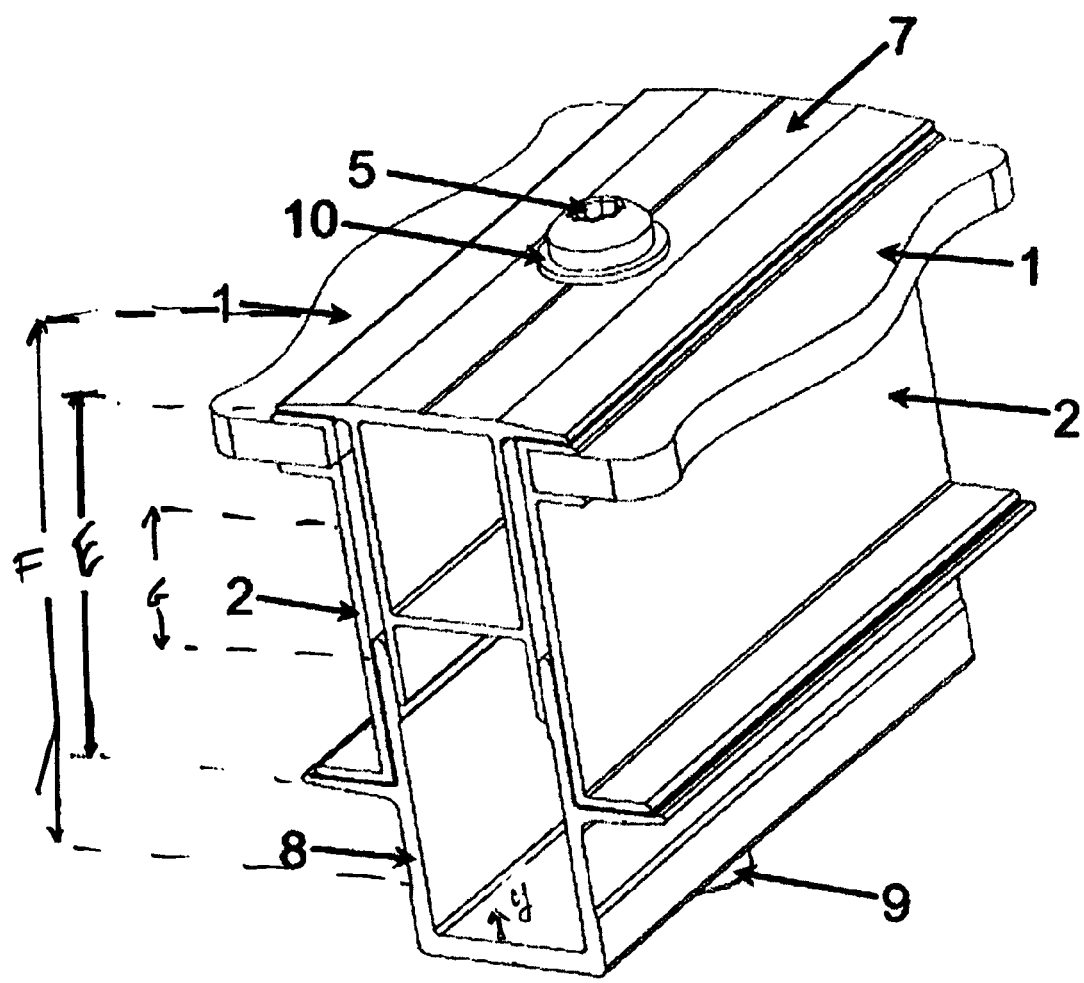
FIG. 2 is an isometric frontal view of a top rail and bottom rail coupled together in accordance with an embodiment.
Figure 3:
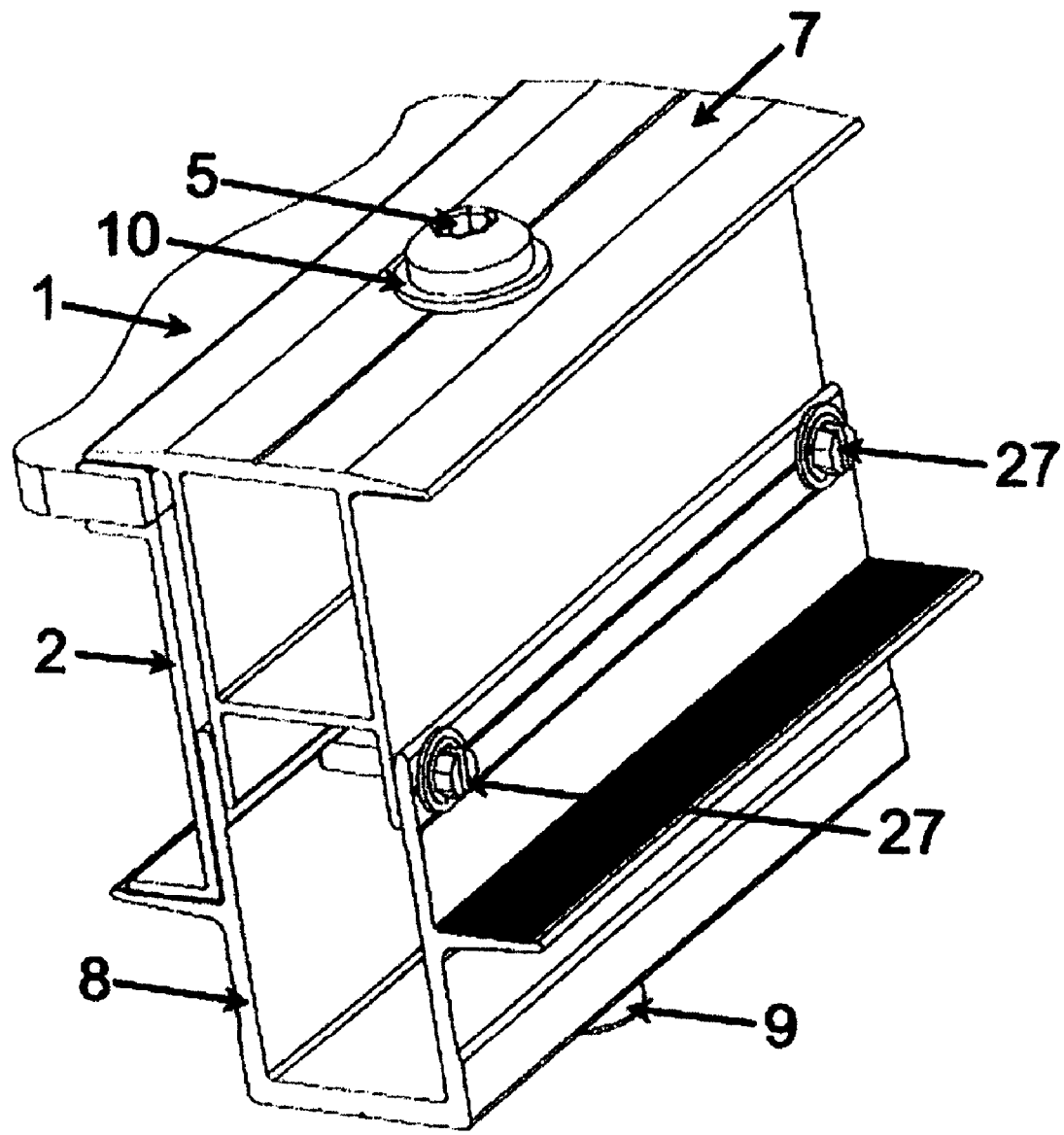
FIG. 3 is an isometric frontal view of a top rail and a bottom rail coupled together and having-a free-edge, according to an embodiment.

FIG. 1 illustrates a solar power assembly 44, according to an embodiment. The assembly 44 includes one or more adjacent rows of PV laminates 1. In an embodiment, PV laminates are mounted within frames 2, and are held captive by a set of compressed rail assemblies. The set of compressed rail assemblies includes a free edge rail assembly 3 (one side of the rail assembly has no modules) and a shared rail compressed assembly 4 (both sides of the rail assembly have modules). With reference to FIGS. 1-3, each of the compressed rail assemblies 3,4 in the set may include an upper rail 7 and a lower rail 8. According to an embodiment, upper rail 7 and/or lower rail 8 are compressed by a regular pattern of compression bolts 5 and threaded inserts 9. The pattern of compression bolts 5 and threaded inserts 9 may be uniformly spaced along the compressed rail assemblies 3,4. The compression of the upper rail 7 and lower rail 8 is the mechanism that holds the PV module frames 2 captive.

The spacing between adjacent rail assemblies 3,4 may be dependent on a width that can be provided by frame 2. The assembly 44 may accommodate variations in the width of module frames 2 because a relative spacing of the compressed rail assemblies 3,4 is adjustable through use of strut runners 6. While an embodiment such as shown in FIGS. 1-3 illustrate use of strut runners 6, numerous other techniques exist and are used to affix the rails at specific offset distances. An example of such alternative techniques include the use of discrete footings.

A set of laminates 1 enclosed by frames 2 is referred to as a module 40. The particular array arrangement of two rows of modules with three modules per row is only illustrative, as additional or fewer modules may be used. Furthermore, modules 40 may have different sizes and/or configurations. For example, larger arrays may be formed from longer compressed rail assemblies 3,4 containing more modules 40 in each row as well as additional rows of modules made possible by using additional shared rail assemblies 4.

FIG. 2 illustrates laminates 1 retained by support structures of the upper rail 7 and the lower rail 8. On each side of the shared rail assembly 4, a first laminate is retained by a lower shelf 11 and an upper shelf 21. Other types of support structures may be provided. A force provided by compression bolt 5 (and corresponding threaded insert 9) may be used to compress the lower shelf 11 and the upper shelf 21 towards one another. In one embodiment, the upper rail 7 and the lower rail 8 may be loosely held together, with support being provided by the relative interleave structure of the two rails. An embodiment enables the installer to first loosely position the upper and lower rails 7, 8, then compress the two rails together. When compressed sufficiently to retain the solar modules, the upper rail 7 and the lower rail 8 are said to be in an engaged position (as shown by the length E).

However, the upper rail 7 and the lower rail 8 are structured to move with respect to one another in an axial position (along axis Y). With further reference to FIG. 2, the upper rail 7 may be interleaved with respect to the lower rail 8, and slideably engaged, so that the two rails are moveable in the axial direction with respect to one another. In an embodiment, the upper rail 7 and lower rail 8 may be moved between an extended relative position (length F) and contracted relative position (length G). At any position between the extended and contracted relative position, the upper rail 7 and lower rail 8 may be compressed together by bolt 5 and threaded insert 9 (or some other compression mechanism) to fix a solar module having a thickness matching the spacing between the two relative positions. Therefore, the relative movement affects a length between the lower shelf 11 and the upper shelf 21. This length can be adjusted in order to retain modules of varying thickness. In one embodiment, the range of movement of the lower and upper shelf 11, 21 permits modules to have varying thicknesses. For example, a single rail assembly such as shown may accommodate a module having a thickness that ranges more than 0.25 inches. Based on embodiments described herein, a range of adjustability for a particular rail assembly may be anywhere between 0.25 and 2.0 inches total. This flexibility enables the installer to adjust the rails on-the-fly.

The free edge rail assembly illustrated in FIG. 3 may be constructed to be similar to the shared rail assembly of FIG. 2. Specifically, a similar or even identical interleaving construction between the upper rail assembly 7 and lower rail assembly 8 may be used, thereby permitting relative movement of the upper shelf 21 and lower shelf 11 in the axial direction. As with the shared rail assembly, this permits a length between the upper shelf 21 and lower shelf 11 to be adjustable.

Figure 4:
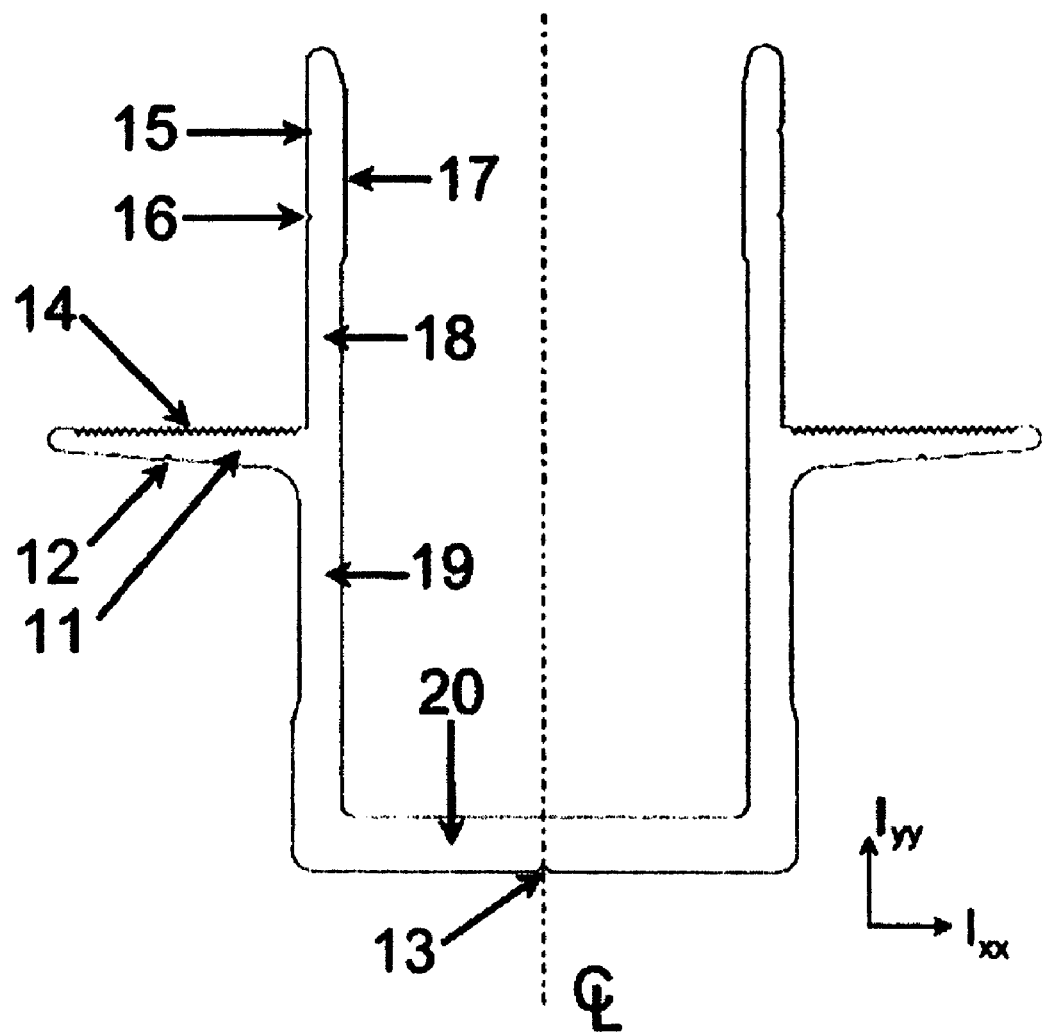
FIG. 4 is a sectional view of a lower rail, according to an embodiment.
Figure 8:
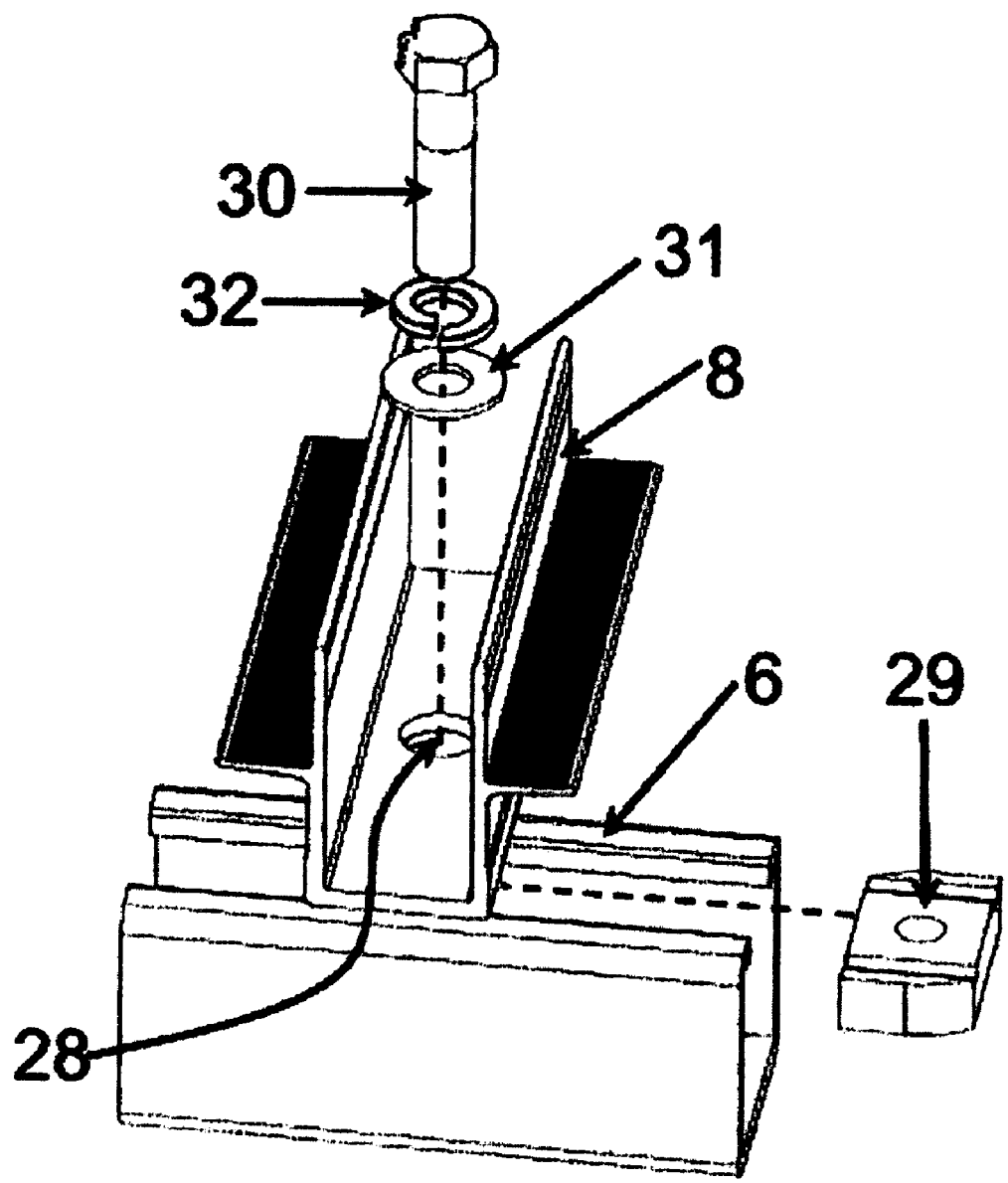
FIG. 8 illustrates use of a strut runner, in accordance with an embodiment.

With additional reference to FIG. 8, an embodiment is shown in which lower rail 8 is attached to the strut runners 6 such that a fixed spacing between adjacent rail assemblies 3,4 may be attained. Attachment to commercially available strut runner material such as UNISTRUT of Wayne, Mich. can be performed using a commercially available sliding strut nut 29 in combination with a strut nut bolt 30 and washer set 31, 32. To perform this method of mounting, a mounting hole 28 is drilled in the lower rail 8 such that the strut nut bolt 30 may pass through the lower rail 8 and thread into the sliding strut nut 29. As illustrated in FIG. 4, the lower rail 8 contains an attachment drill starter mark 13 that centers the mounting hole 28 within the lower rail 8. Once the lower rail has been properly placed, the combination of strut nut bolt 30 and strut nut 29 may be tightened thereby clamping the lower rail 8 against the strut runner 6 and holding it at a fixed position. Although a continuous strut runner 6 may be used that passes continually under the adjacent rail assemblies 3,4, small discrete runners on the order of 4" in length may also be employed.

As illustrated by FIGS. 4 and 8, one benefit of using a strut runner 6 connection with a sliding strut nut 29 over fixed footings is that adjustments of the spacing between adjacent compressed rail assemblies 3,4 may be made by simply sliding the lower rail 8 along the long axis of the strut runner 6 without relocating a fixed footing or drilling additional holes in a runner that is not of a strut-based design. Attachment of the lower rail 8 to strut runners 6 or other footings is not limited to a bolted connection through the lower rail base 20, but may be achieved with any number of configurations including but not limited to brackets or clips that engage with features on the lower rail.

The strut runners 6, or discrete footings are typically anchored to a mounting surface 34 (see FIG. 1), such as a roof, by using lag bolts that penetrate the roof sheathing and anchor into rafters or trusses. In this manner, the entire array is anchored to the mounting surface 34. In addition to a roof, the primary mounting surface 34 may be roof mounted curbs, a carport structure, pylons, or any variety of structural surfaces. Also, while lag bolts are the most common means of attaching strut runners 6, various other methods of fastening may be employed ranging from threaded bolts to adhesives.

Referring again to FIG. 1, one embodiment is provided in which a shape of the upper rail 7 and lower rail 8 is identical in the two forms of the rail assemblies 3,4, but the manner in which they obtain their respective compression is different. The first form is illustrated by the shared rail assembly 4 where modules are mounted on both sides. The second form is illustrated by the free edge rail assembly 3, in which modules are mounted on only one side. A free edge rail assembly 3 occurs on the outermost rows of an array. In a configuration such as shown, the array of modules 40 includes two free edge rail assemblies 3 and any number of shared rail assemblies 4, including none at all, depending on the number of rows of modules to be mounted.

Figure 5:
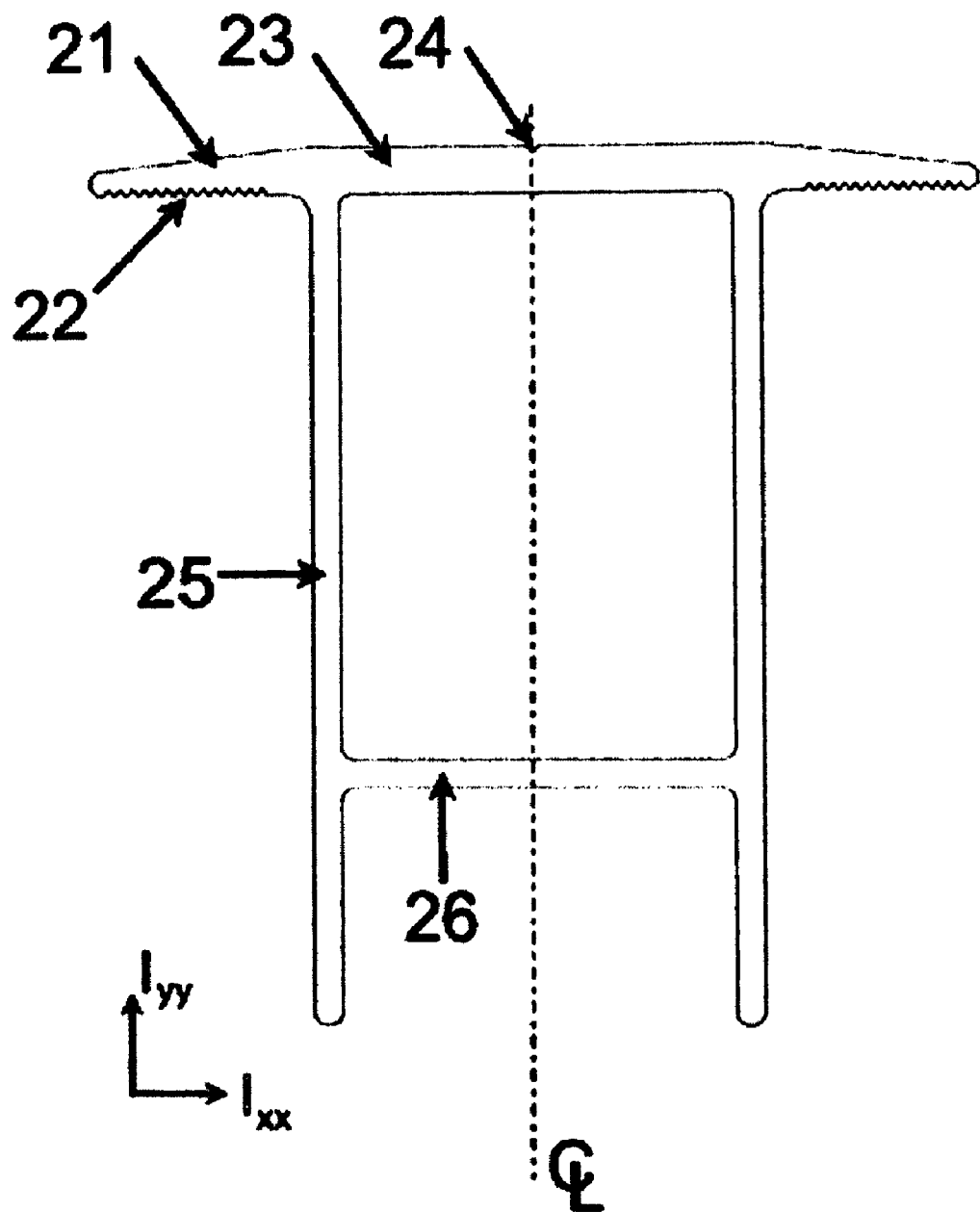
FIG. 5 is a sectional view of a upper rail, according to an embodiment.

FIG. 2 shows a short section of shared rail assembly 4. The shared rail assembly 4 includes the compression mechanism formed by the compression bolt 5, flat washer 10, and threaded insert 9. The operation of the shared rail assembly 4, is best understood in conjunction with the cross sectional views of the lower rail 8 as shown in FIG. 4 and the cross sectional view of the upper rail 7 as shown in FIG. 5. Because the shared rail assembly has left-right symmetry, only one side of the assembly will be described.

In the shared rail assembly 4, the base of the PV module frame 2 is vertically supported by the lower module shelf 11, which extends from the lower rail base flange 19. The vertical wall of the PV module frame 2 is supported by the lower rail extended flange 18. Capture of the PV module frame 2 onto the lower rail 8 is achieved by the upper module shelf 21, which is structurally linked to the force formed by the compression bolt 5, by means of the upper rail cap 23. The upper rail vertical flange 25 is designed to slide fit with the centering lands 17 on the lower rail 8 thereby centering the upper rail 7 within the lower rail 8.

On shared rail assembly 4, tightening of the compression bolt 5 acts to rigidly compress the PV module frame 2. By tightening the compression bolt 5 and threaded insert 9, the upper rail cap 23 (FIG. 5) and lower rail base 20 (FIG. 4) are directed towards one another. Since the upper module shelf 21 is structurally connected to the upper rail cap 23 and the lower module shelf 11 is structurally connected to the lower rail base 20 by means of the lower rail base flange 19, the upper module shelf 21 and lower module shelf 11 are likewise brought closer together through a tightening of the compression bolt 5 and threaded insert 9. Once the upper module shelf 21 and lower module shelf 11 have been brought together in this manner to be in contact with the PV module frame 2 and the slack in the compression bolt 5 has been taken up, further tightening of the compression bolt 5 will result in the tension force in the bolt to be translated as a compression force of the upper module shelf 21 and lower module shelf 11 onto the PV module frame 2. This compression of the PV module frame 2 between the upper rail 7 and lower rail 8 is the means of structural attachment of the PV module frame 2 onto the shared rail assembly 4.

FIG. 3 shows a short section of free edge rail assembly 3. The free edge rail assembly 3 includes the compression mechanism formed by the compression bolt 5, flat washer 10, and threaded insert 9. The operation of the free edge rail assembly 3 is described in conjunction with the cross sectional views of the lower rail 8 as shown in FIG. 4 and the cross sectional view of the upper rail 7 as shown in FIG. 5. Unlike the shared rail assembly 4, the free edge rail assembly does not exhibit a left-right symmetry because a PV module frame 2 exists on only one side of the free edge rail assembly 3 as illustrated in FIG. 3. Whereas the upper module shelf 21 and lower module shelf 11 are held mutually parallel by the PV module frame 2 on the left side of the free edge rail assembly 3 as shown in FIG. 3, no such support structure for maintaining this parallel arrangement is inherently provided for the right side of the free edge rail 3 as shown in FIG. 3.

The screws 27 may be used to secure the relative position of the upper rail vertical flange 25 with respect to the lower rail extended flange 18 at a desired position. The desired position is determined at the point where the upper module shelf 21 and the lower module shelf 11 contact the frame 2 on the side where the frame 2 is installed. At this point, no tension exists in the compression bolt 5 and the upper module shelf 21 and lower module shelf 11 are in the desired parallel arrangement resting on the PV module frame 2. With the rails in the desired position, the screws 27 are inserted through the lower rail extended flange 18 and upper rail vertical flange 25 to fix their relative positions and orientation. At this time, the compression bolt 5 and threaded insert 9 may be tightened. The resulting compression will not result in a displacement of the upper rail vertical flange 25 relative to the lower rail extended flange 18 on the free edge as their relative positions are fixed by the screws 27. Instead, the screws 27 act as a fixed pivot point that transfers the force of the compression bolt 5 into a small displacement that compresses the PV module frame 2, which lies on the opposing side of the free edge rail assembly.

The ability of the screws 27 to fix the relative position of lower rail extended flange 18 and upper rail vertical flange 25 on the side of the free edge rail assembly 3 without PV module frame 2 installed helps the free edge rail assembly to contain the PV module frame. This technique of fixing the relative position and orientation of the lower rail extended flange 18 relative to the upper rail vertical flange 25 is available throughout the full interleaved range of the upper rail 7 and lower rail 8 from the maximum extension illustrated in FIG. 6 to the minimum extension illustrated in FIG. 7. It should be mentioned that the screws 27 used as fasteners may also be supplanted by rivets, dowels, or any other instrument that is capable of fixing the relative position of the lower rail flange 18 and upper rail vertical flange 25. Although a pair of screws 27 is shown, a single screw is capable of fixing the relative position of the flanges.

One embodiment provides that lower rail 8 is formed as an extruded aluminum product with a constant cross section. Other embodiments may, however, provide that the lower rail 8 is formed by processes such as roll forming and brake forming. The preferred cross section of the extruded lower rail 8 is illustrated in FIG. 4. The general shape of the lower rail 8 is that of a U-shaped channel with elevated modules shelves 11 designed to accept an upper rail 7 within its hollow interior. More explicitly, the lower rail 8 consists of a lower rail base 20 of sufficient thickness to accept a threaded insert 9 without it pulling through the material upon tightening of the compression bolt 5. The lower module shelves 11 are elevated above the lower rail base 20 and connected to it through a lower rail base flange 19. The elevation of the lower module shelves 11 allows for clearance of electrical junction boxes installed on many PV laminates 1, which often extend below the PV module frame 2. The upper surface of the lower module shelf 11 has a textured grip surface 14 to more securely fasten the PV module frame 2 upon compression. The lower rail extended flange 18 is a vertical continuation of the lower rail base flange 19.

According to an embodiment, lower rail extended flange 18 provides a lateral rest stop for the PV module frame 2, so that it does not slide into the hollow interior during installation. The lower rail extended flange 18 also provides a structure through which screws 27 may pass to pin the location of the upper rail on the free edge rail assembly 3 as outlined above. Extruded drill starter marks 15 and 16 are provided for the purpose of drilling the pilot holes for the screws 27. While it is possible that the reinforcing web 26 of the upper rail 7 may interfere with one of the drill starter marks 15,16, they are spaced such that one of the starter marks 15 or 16 will be available for the screw 27 when assembling a free edge rail assembly 3. Still further, lower rail extended flange 18 provides a surface on which the centering lands 17 may be placed. It is also possible to eliminate the centering lands 17 from the design of the lower rail 8 and to utilize the lower rail extended flange 18 itself for the purpose of centering the upper rail 7 within the lower rail 8.

Similarly, an embodiment provides that the upper rail 7 is formed as an extruded aluminum product. Other embodiments provide that the upper rail 7 is formed through roll forming or brake forming. FIG. 5 illustrates a cross-section of the extruded upper rail 7, under one embodiment. A general shape of upper rail 7 corresponds to a T-shaped section designed to slip fit into the hollow interior of the lower rail 8. More explicitly, the upper rail consists of an upper rail cap 23, which is the surface the compression bolt 5 tightens against. The upper rail cap contains a bolt drill starter 24, which is used at the factory to pilot the patterned holes for the compression bolts. The upper module shelf 21 appears as an extension of the upper rail cap 23. The underside of the upper module shelf 21 has a textured grip surface 22 to securely fasten the PV module frame 2 upon compression. Upper rail vertical flanges 25 extend downwards from the upper rail cap 23. One purpose of the upper rail vertical flanges 25 is to provide a fastening surface for the screws 27 used to fix the free edge rail assembly 3. It is the overlap of this upper rail vertical flange 25 and the lower rail extended flange 18 that allows one or more screws 27 to create the pivot point necessary for properly compressing the free edge rail assembly 3. Another purpose of the upper rail vertical flanges is to provide guides to center the upper rail 7 within the lower rail 8 by sliding against the centering lands 17. An upper rail reinforcing web 26 bridges the upper rail vertical flanges 25 to increase their rigidity and that of the overall upper rail 7. According to one embodiment, an overall arrangement of the component parts is designed to create upper rail 7 with a rigidity on par with that of the lower rail 8 such that it can significantly distribute the force of the compression bolt 5 upon assembly and participate in resisting any external wind or snow loads the array may experience after it is installed. More explicitly, the upper rail 7 is designed to have an inertial moment about the x-axis $I_{xx}$ within 40% of that for the upper rail.

Figure 6:
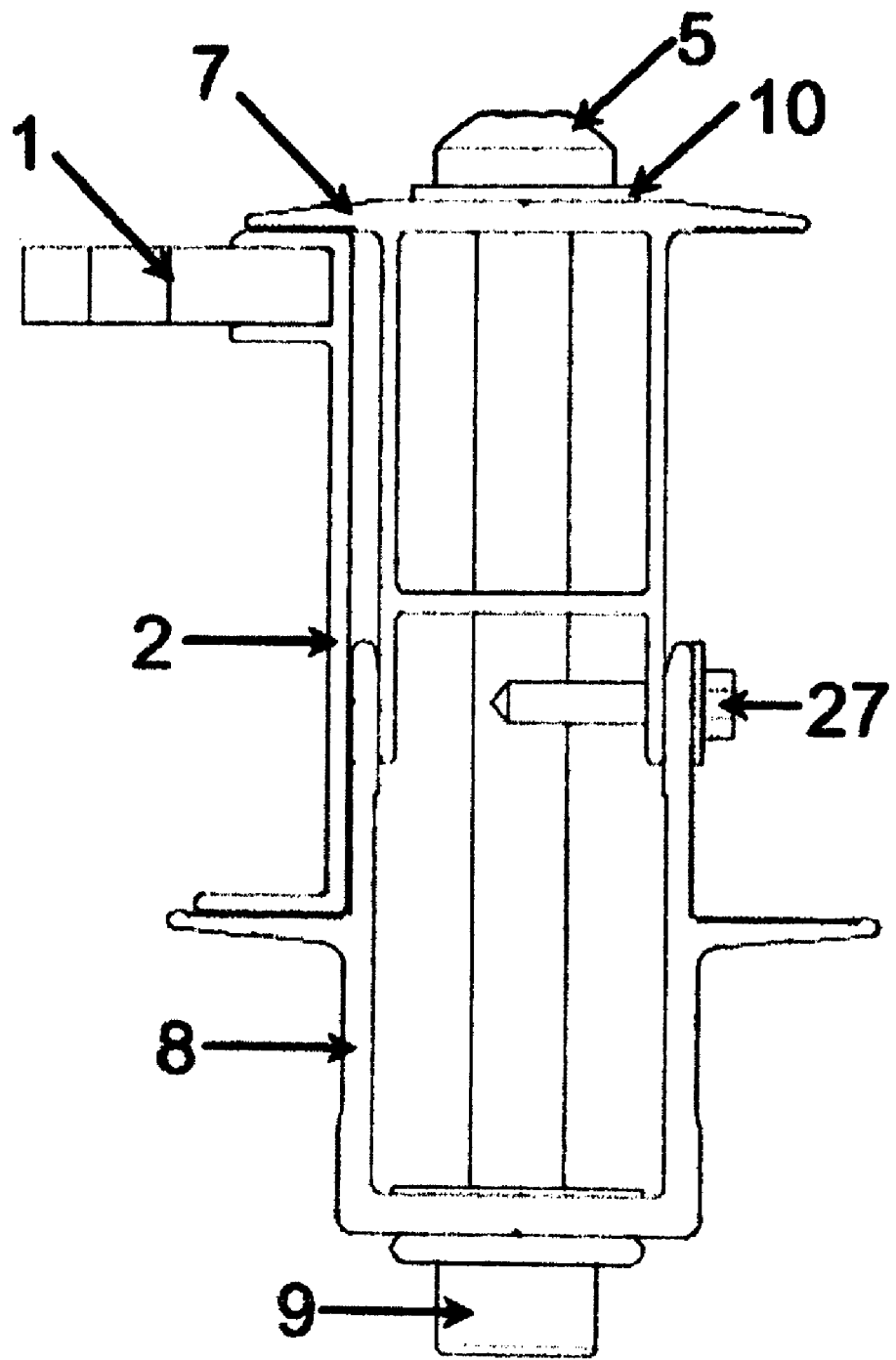
FIG. 6 is a sectional view of a upper rail and a lower rail interleaved together and compressed to retain a solar module while in an extended position, according to an embodiment.
Figure 7:
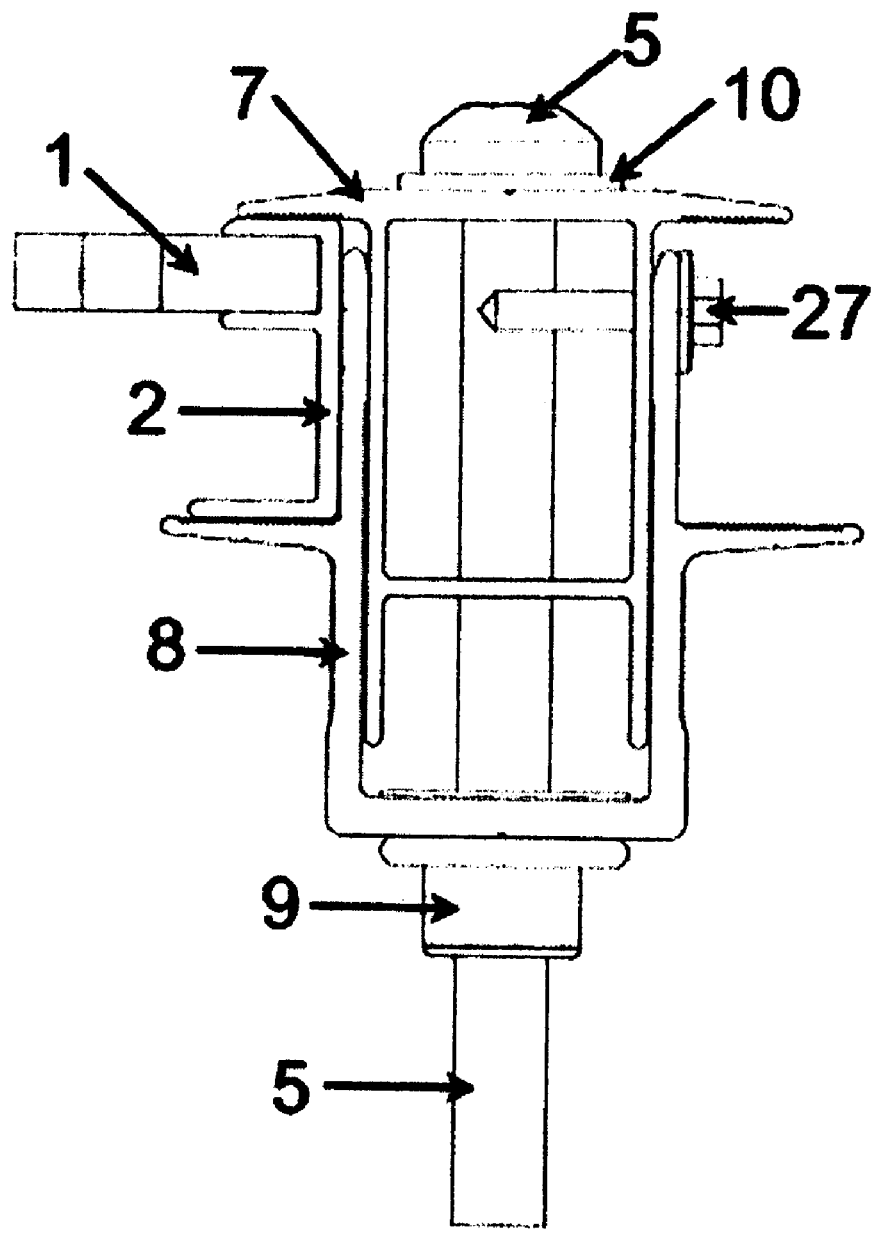
FIG. 7 is a sectional view of a upper rail and a lower rail interleaved together and compressed to retain a solar module while in a contracted position, according to an embodiment.

FIG. 6 and FIG. 7 show cross sections of the free edge rail assembly 3 at maximum extension with a tall PV module frame 2 and at minimum extension with a short PV module frame 2 respectively. In this way, FIG. 6 and FIG. 7 illustrate the capability of the upper rail 7 and lower rail 8 to interleave or otherwise telescope within one another in order capture a wide range of PV module frames 2 while still yielding an overlap of the upper rail vertical flange 25 and lower rail extended flange 18. This permits screw fasteners 27 to individually pass through the upper rail vertical flange 25 and the lower rail extended flange 18 in order to pin the position and orientation of the free edge.

Figure 9:
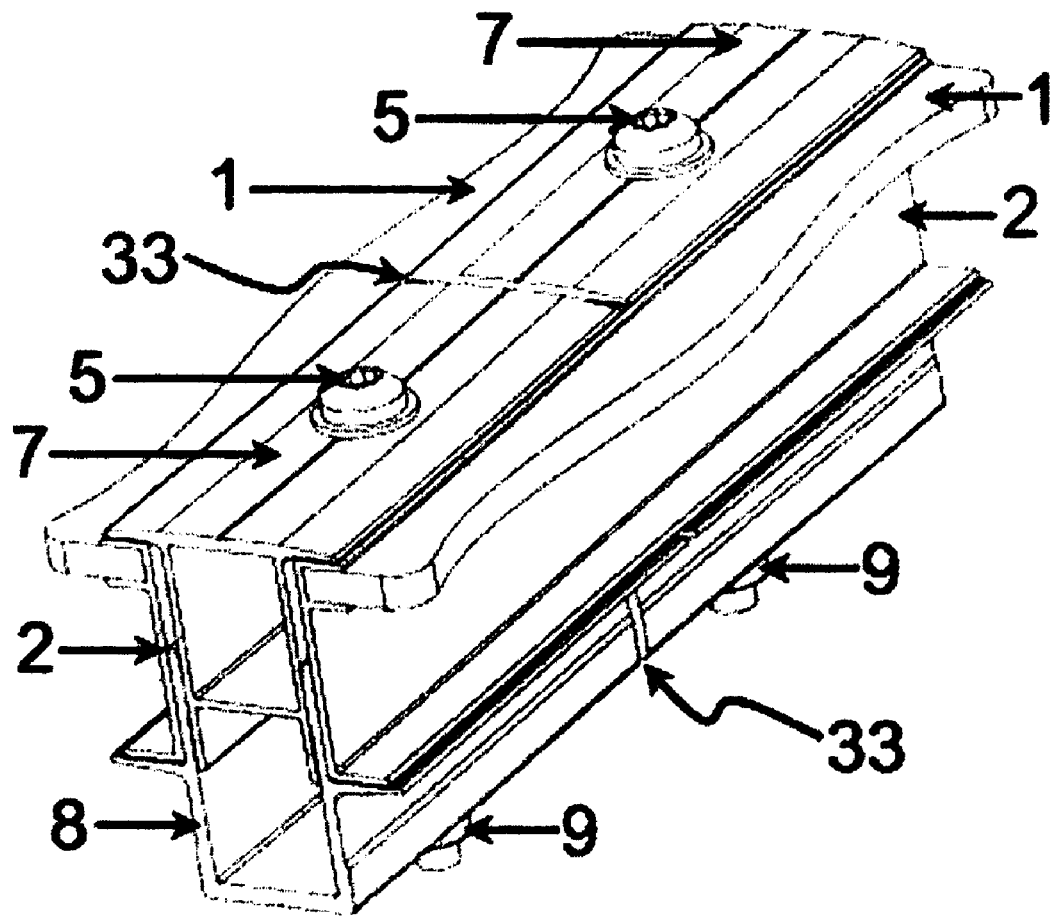
FIG. 9 illustrates a splice connection between two shared rail assemblies 4, according to an embodiment.

Embodiments described above also provide the ability to splice two shared rail assemblies 4 or free edge rail assemblies 3 together to yield a longer and effectively continuous versions of those rail assemblies. FIG. 9 illustrates a splice connection between two shared rail assemblies 4, according to an embodiment. The splice connection is formed by abutting two shared rail assemblies 4 with a small intermediate expansion gap 33. It is desirable that a contiguous PV module frame 2 span the splice expansion gap 33. The PV module frame 2 carries the shear forces between the adjacent shared rail assembles 4 and keeps them in proper alignment. As a practical matter, the PV module frame 2 should extend for several inches on both sides of the splice expansion gap 33 to guarantee a secure connection. Although the adjacent shared rail assemblies 4 could directly abut one another, the splice expansion gap 33, which is on the order of a fraction of an inch, allows for thermal expansion and contraction of adjacent shared rail assemblies. Although FIG. 9 outlines the splice connection for shared rail assemblies 4, a similar arrangement is easily envisioned and formed for free edge rail assemblies 3. Using the same splice method it is also possible to splice and transition from a shared rail assembly 4 to a free edge rail assembly 3 and vice versa.

Tilt Racked Array

Embodiments described above (such as illustrated in FIG. 1) are capable of mounting directly to mounting surface 34 (e.g. roof, platform, deck). For example, the assembly 44 may be secured to mounting surface 34 by first securing the strut runners 6 to the mounting surface 34 using traditional fastening mechanisms, such as lag bolts, hangar bolts, stanchions, or other suitable forms. In another embodiment, the assembly 44 comprising the array of modules 40 may be elevated above the mounting surface 34. The assembly 44 may also be tilted at an angle beyond the mounting surface 34. This method of racking the structure is often referred to as a tilt-rack configuration.

Figure 10:
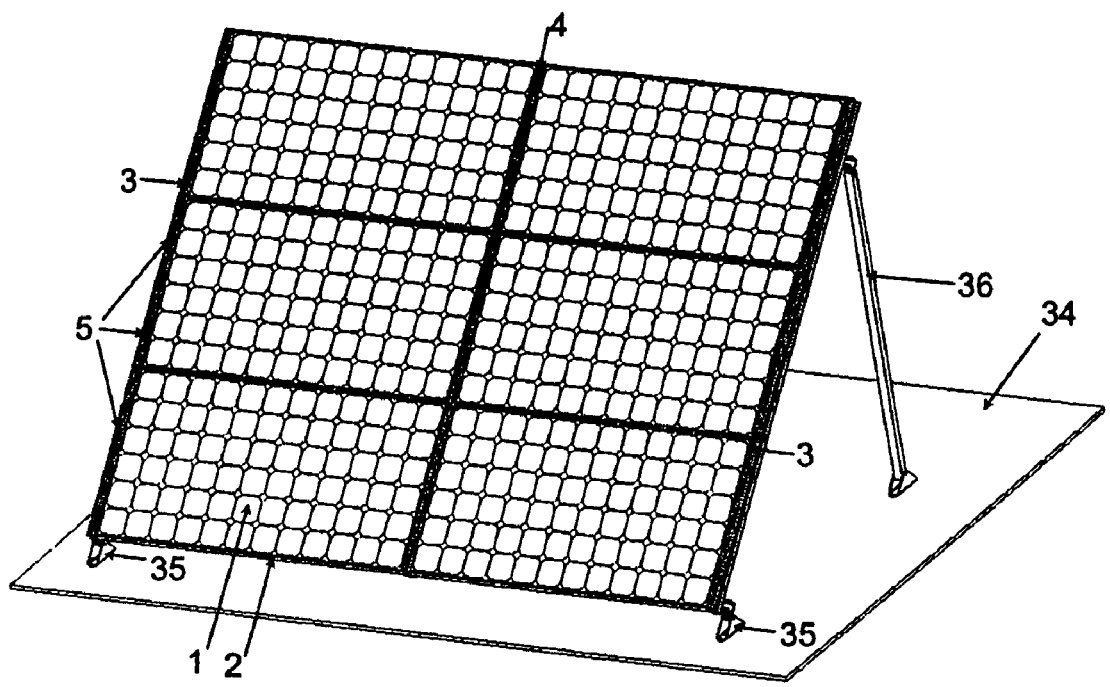
FIG. 10 illustrates an embodiment where a solar module assembly can be mounted in a tilted and elevated position with respect to a mounting surface.
Figure 11:
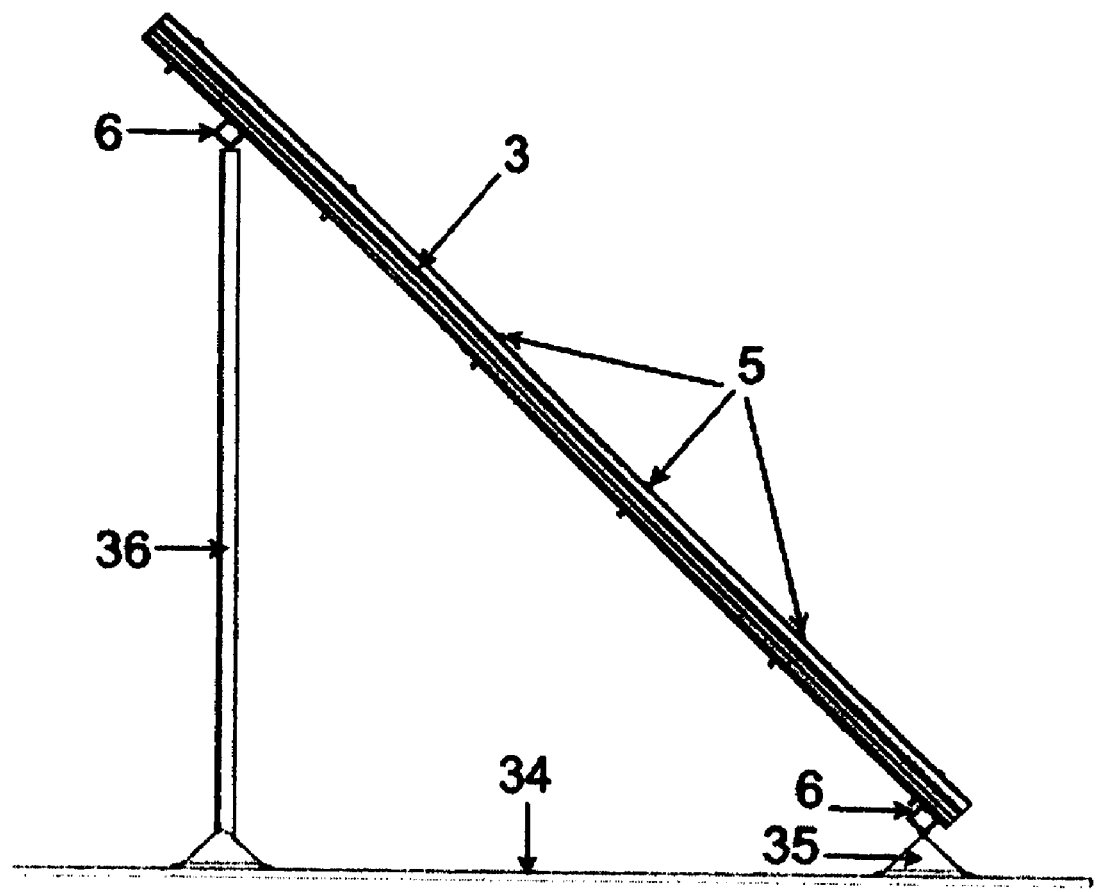
FIG. 11 is a side view of FIG. 10.

FIGS. 10 and 11 illustrate assembly 44 when employed in a tilt-rack configuration, under an embodiment of the invention. In a tilt-rack configuration, the set of continuous strut runners 6 that support and space the rail assemblies 3,4 are mounted in a set of pivot hinged front feet 35 and supported by a set of rear legs 36. The front feet 35 effectively anchor the toe of the array and the rear legs 36 serve to elevate and support the array of modules 40 above the mounting surface 34. One benefit of the continuous strut runners 6 is that they permit the front feet 35 and rear legs 36 to be placed anywhere along the strut runners 6 and not just at the locations of the compressed rail assemblies 3,4. This allows the front feet 35 and rear legs 36 to be placed at the structural members that support the mounting surface 34 such as rafters, beams or trusses. Another benefit of the continuous strut runners 6 in a tilt-rack application is that when combined with the solar modules 40, and rail assemblies 3,4, a monolithic array and sub-structure is formed that not only resists loading oriented normal to the plane of the array but also resists lateral forces within the plane of the array that would pull it out of square. In essence, this combination of components and their arrangement imitates the concept of a shear wall in the construction trade. This ability of the monolithic array to resist lateral in plane forces largely eliminates the need for additional cross bracing of the rear legs 36 and is an advantage over mounting systems that rack individual rows of PV modules without any common structural connection between adjacent rows.

Alternatives and Advantages

Embodiments described herein have the ability to perform seamless front-side mounting of a wide variety of solar modules using a single rail set. Furthermore, according to an embodiment, an interleaved design of the rail set allows for the free edge rail assembly to be fixed or pinned thereby eliminating the need for multiple rail sets or dummy module frames when mounting solar modules of various heights. The design of the upper rail as a structural section on par with the lower rail allows for several advantages. One advantage of such an embodiment is that it spreads the point load of the compression bolt over a larger area of the module frame. By spreading the point load, larger compression forces are possible without damage to the frame or laminate. This increased compression force allows the rail set to be oriented vertically and in tilt-rack configurations without concern for the modules sliding out from the rails. A structural upper rail section also allows for rail sets to be spliced together using the module frame itself as the structural splice, which obviates the need for separate dedicated splices.

Embodiments described herein may also include a design that includes an aesthetic seamless mounting system while also maintaining high structural rigidity for the wide variety of PV module frames in the market. Such an embodiment allows a single rail to be used in a typical application, thereby reducing inventory, cost, and the need for separate hardware to splice rail sets.

Both the lower module shelf 11 and the upper module shelf 21 are examples of support structures. Other forms of support structures may be used, including, for example, protrusions that engage the PV module frame 2 or PV laminates 1.

Although the figures and descriptions above illustrate a common set of upper and lower rails, which are employed for both the free edge and shared rail assemblies, it is possible to use a simpler rail set for the free edge rail assembly. This simpler rail set would exclude the extended shelves from one side of the rail set as they serve no function on the free edge and only add weight and cost. Eliminating the extended shelves from the free edge also presents a flush appearance, which increases the aesthetics of the installation.

Although embodiments described above provide for an interleaved rail structure in which the upper rail is nested within the lower rail, it is also possible to reverse this structure by having an upper rail that fits over and interleaves with a lower rail.

Furthermore, while embodiments described above include a fastener that penetrates through the overlapping flanges of the upper and lower rails as a means of fixing the free edge, other mechanisms are possible. For example, serrated grooves on the mating flange surfaces may be extruded. With such an embodiment, the free edge begins turning over slightly, the serrated grooves would contact and interlock thereby fixing the height of the free edge. A multitude of additional locking mechanisms exist for fixing the height of the free edge in an interleaved rail structure.

Conclusion

Although the descriptions above contain many specifics, these should not be construed as limiting the scope of the invention but as merely providing illustrations of some embodiments.

What is claimed is:

1. An assembly for mounting solar modules to a surface, the assembly comprising:
   two or more compressed rail assemblies to retain one or more solar modules, each rail assembly comprising:
   an upper rail including an upper support structure and one or more upper flange members;
   a lower rail including a base, one or more lower flange members that each extend upward from the base, and a lower support structure that extends from at least one of the flange members;
   wherein one of the one or more upper flange members or the one or more lower flange members is disposed within and adjacent to the other of the one of the one or more upper flange members or the one or more lower flange members, so that the upper rail and the lower rail are interleaved to provide an adjustable spacing between the upper support structure and the lower support structure for receiving an end of an individual solar module; and
   a compression mechanism comprising a plurality of components that combine to extend the compression mechanism vertically through the upper support structure and the base of the lower rail, so as to extend out of the lower rail, the compression mechanism being structured to engage the interleaved upper and lower rail in order to compress the upper support structure and lower support structure in grasping the end of at least one solar module.

2. The assembly of claim 1, wherein the upper rail and the lower rail are axially adjustable when engaged to enable variation of a spacing between the upper support structure and the lower support structure that is sufficient to enable any one of a set of one or more solar modules to be retained therein, wherein each set has a thickness that is different than a thickness of another set.

3. The assembly of claim 2, wherein a range of adjustability for the spacing is greater than 0.25 inches.

4. The assembly of claim 3, wherein a range of adjustability for the spacing is anywhere between 0.25 inches and 2.0 inches.

5. The assembly of claim 1, wherein a lateral movement of either an upper flange of the upper rail extending downward, or the lower flange of the lower rail extending upward, is confined at least in part by the other of the upper flange or the lower flange when the upper rail and the lower rail are adjusted axially.

6. The assembly of claim 1, wherein the compression mechanism includes one or more mechanical fasteners.

7. The assembly of claim 1, wherein the compression member includes a compression bolt.

8. The assembly of claim 1, wherein the upper rail and the lower rail are securable by an interlocking feature provided within the rails that enables the upper rail and the lower rail to be fixed with respect to each other.

9. The assembly of claim 1, wherein the compression mechanism includes a bolt that extends through each rail assembly at either a top end or at a bottom end, and a fastener that secures the bolt at the other of the top end or the bottom end.

10. The assembly of claim 1, further comprising a strut runner that couples to the lower rail in order to couple the lower rail to the surface and provide a fixed spacing for another lower rail.

11. The assembly of claim 10, wherein the strut runner includes a slot that extends in a lengthwise direction, wherein the slot is dimensioned to receive a component or portion of the compression mechanism extending through at least a base of the lower rail.

12. The assembly of claim 1, wherein the upper rail has a corresponding inertial mass about a lateral direction that is within 40% of a corresponding inertial mass of the lower rail.

13. The assembly of claim 10, wherein the strut runner is elevated and tilted in a plane above the surface by a pivotal base coupling mechanism.

14. The assembly of claim 13, wherein the pivotal base coupling mechanism includes one or more pivotally hinged front feet.

15. The assembly of claim 13, further comprising one or more supporting rear legs to support the strut runner in the plane.

16. An assembly for mounting solar modules to a surface, the assembly comprising:
an upper rail on which an upper support structure for at least partially retaining one or more of the solar modules is provided, wherein the upper rail includes one or more upper flange members;
a lower rail on which a lower support structure for at least partially retaining one or more of the solar modules is provided, the lower rail comprising a base, and one or more lower flange members that each extend upward from the base, wherein the lower support structure extends from at least one of the flange members;
wherein at least one of the upper support structure and the lower support structure are structured to support one or more solar modules;
an interleaving means for coupling the upper rail and the lower rail to one another so that at least one of the upper rail and the lower rail is moveable relative to the other of the upper rail and the lower rail, wherein the interleaving means includes one of the one or more upper flange members or the one or more lower flange members disposed within and adjacent to the other of the one of the one or more upper flange members or the one or more lower flange members;
a compression mechanism that extends through the upper support structure and through the base of the lower rail, wherein the compression mechanism is adjustable to axially compress or loosen the interleaved and coupled upper rail and lower rail so as to enable adjustment and retention of one or more solar modules between the upper support structure and the lower structure.

17. The assembly of claim 7, further comprising one or more fasteners that laterally secure the upper rail and lower rail when the upper rail and lower rail are compressed and assembled.

18. The assembly of claim 1, wherein the upper rail is U-shaped to receive the other of the upper or lower rail in an interleaved and slidable engagement.

19. The assembly of claim 1, wherein each of the upper rail and lower rail includes opposing flanges that are U-shaped.

20. The assembly of claim 19, wherein when assembled, the opposing flanges of the upper and lower rails are nested and interleaved.

21. An assembly for mounting a plurality of solar modules onto a surface, the assembly comprising:
a plurality of rail assemblies, each rail assembly including:
an upper rail on which an upper support structure is provided, wherein the upper rail comprises one or more upper flange members;
a lower rail comprising a base, one or more lower flange members that each extend upward from the base, and a lower support structure that extends from at least one of the flange members
a compression mechanism;
wherein the upper rail, the lower rail, and the compression mechanism are assemblable on site of the surface to operatively support the plurality of solar modules on the surface, the upper and lower rail being structured and dimensioned with respect to the compression mechanism so that the compression mechanism is assembled to extend through the upper support structure and through the base of the lower rail to compress each of the upper and lower rail against one another;
wherein when the assembly is at least partially assembled on site of the surface, (i) the upper rail extends downward towards the lower support structure, and the lower rail extends upwards towards the upper support structure; (ii) one of the one or more upper flange members or the one or more lower flange members is disposed within and adjacent to the other of the one of the one or more upper flange members or the one or more lower flange members, so that the upper rail and the lower rail are interleaved to be slideably engaged in order to enable the upper rail and the lower rail to axially adjust positions; (iii) the compression mechanism is adjustable to axially compress or loosen the interleaved engagement of the upper rail and lower rail so as to enable adjustment and retention of one or more solar modules retained between the upper support structure and the lower structure; and
one or more strut runners that interconnect the rail assembly to the surface, wherein each of the plurality of rail assemblies is coupled to the one or more strut runners to be adjustable in position along a lateral direction.

22. The assembly of claim 21, wherein the upper rail, the lower rail and the one or more strut runners are configured so that when assembled on site of the surface, the plurality of solar modules are supported so that adjacent pairs of solar modules provided along at least a first direction seamlessly abut one another.

23. The assembly of claim 1, wherein the compression mechanism is operable to adjust the interleaved engagement of the upper rail and lower rail, to affect the spacing between the upper support structure and the lower support structure in grasping solar modules of varying thicknesses.

24. The assembly of claim 9, where the compression mechanism includes a captive nut provided on the lower rail such that the upper rail and the lower rail may be compressed into the engaged position without requiring an installer to have access to the lower rail.

25. The assembly of claim 9, wherein the bolt of the compression mechanism is inserted into the upper rail via an opening in a top surface of the upper rail, and extends through an opening in the base of the lower rail in order to extend completely through the lower rail.

26. The assembly of claim 25, wherein the upper rail and the lower rail are each rectangular and hollow structures, and wherein the bolt of the compression mechanism is passed through a void of each of the hollowed upper and lower rails.

27. The assembly of claim 1, each of the upper rail and lower rails include at least a flange that includes one or more side fasteners, each of the one or more side fasteners extending through one of the flanges of the lower rail and a corresponding flange of the upper rail.

28. The assembly of claim 27, wherein the side fasteners compress the flange of each of the upper and lower rails against one another and support the compression member.

29. The assembly of claim 27, wherein the side fasteners are positioned to fix the position of the flanges from the upper and lower rails.

30. The assembly of claim 1, further comprising two free edge rail assemblies, each free edge rail assembly extending the upper and lower support structures in only one direction, so that the each free edge rail assemblies extend the respective upper and lower support structures towards the other of the two free edge rail assemblies.

31. The assembly of claim 30, further comprising at least three compressed rail assemblies, including the at least two free edge rail assemblies and at least one shared rail assembly that extends each of the upper support structure and lower support structure in opposite directions, symmetrically about a vertical reference.

* * * * *